United States Patent

Bertram et al.

[11] Patent Number: 5,186,905
[45] Date of Patent: Feb. 16, 1993

[54] CARTRIDGE PORT DESIGN FOR DISPENSING FOAM PRECURSORS

[75] Inventors: George T. Bertram, Newtown; Semyon Krislav, Stamford, both of Conn.

[73] Assignee: Sealed Air Corporation, Saddle Brook, N.J.

[21] Appl. No.: 730,708

[22] Filed: Jul. 16, 1991

[51] Int. Cl.⁵ .................. B01F 15/02; B67D 5/60; G01F 11/28
[52] U.S. Cl. .................................. 422/133; 239/88; 366/76; 366/177; 422/103
[58] Field of Search ............ 422/133, 103; 239/88; 366/76, 177, 150

[56] References Cited

U.S. PATENT DOCUMENTS

| | | | |
|---|---|---|---|
| 3,690,556 | 9/1972 | McCain | 239/112 |
| 3,784,110 | 1/1974 | Brooks | 239/304 |
| 3,790,030 | 2/1974 | Ives | 222/135 |
| 3,930,619 | 1/1976 | Levey et al. | 239/526 |
| 4,023,733 | 5/1977 | Sperry | 239/112 |
| 4,062,525 | 12/1977 | Harmon et al. | 366/138 |
| 4,083,474 | 4/1978 | Waite et al. | 222/145 |
| 4,193,701 | 3/1980 | Koch et al. | 366/177 |
| 4,344,919 | 8/1982 | Keiterbaum | 422/133 |
| 4,377,256 | 3/1983 | Commette et al. | 239/117 |
| 4,386,899 | 6/1983 | Cook | 425/225 |
| 4,443,177 | 4/1984 | Modur et al. | 425/543 |
| 4,568,003 | 2/1986 | Sperry et al. | 222/145 |
| 4,674,268 | 6/1987 | Gavronsky et al. | 53/468 |
| 4,702,890 | 10/1987 | Wallner | 422/133 |
| 4,800,708 | 1/1989 | Sperry | 53/449 |
| 4,802,770 | 2/1989 | Fiorentini | 366/177 |
| 4,898,327 | 2/1990 | Sperry et al. | 239/1 |

Primary Examiner—Robert J. Warden
Assistant Examiner—Stephanie Blythe
Attorney, Agent, or Firm—Bell, Seltzer, Park & Gibson

[57] ABSTRACT

An improved chemical injection assembly is disclosed of the type in which a hollow cylindrical housing with an outer surface defines an outer diameter and an inner surface defines an inner diameter. The hollow portion or bore defined by the inner surface in turn defines a cylindrical mixing chamber along the axis of the housing. At least one entry port assembly is positioned within the cylindrical housing prependicularly to the housing's axis. The port assembly comprises an entry opening that extends through the housing to form a path of fluid communication through the housing to the mixing chamber, and an entry fitting positioned in the entry opening. The fitting has front and rear coaxial portions with a common axial opening therethrough. The rear portion is adjacent to the housing and the front portion is adjacent to the cylindrical mixing chamber. The end of the front portion that is adjacent the chamber has a curved face that substantially matches and aligns with the corresponding arc of the mixing chamber so that the curved face and the inner surface are flush with one another. The entry fitting further comprises means associated with the rear portion for maintaining the curved face of the front portion substantially in place and flush with the corresponding arc portion of the chamber.

21 Claims, 2 Drawing Sheets

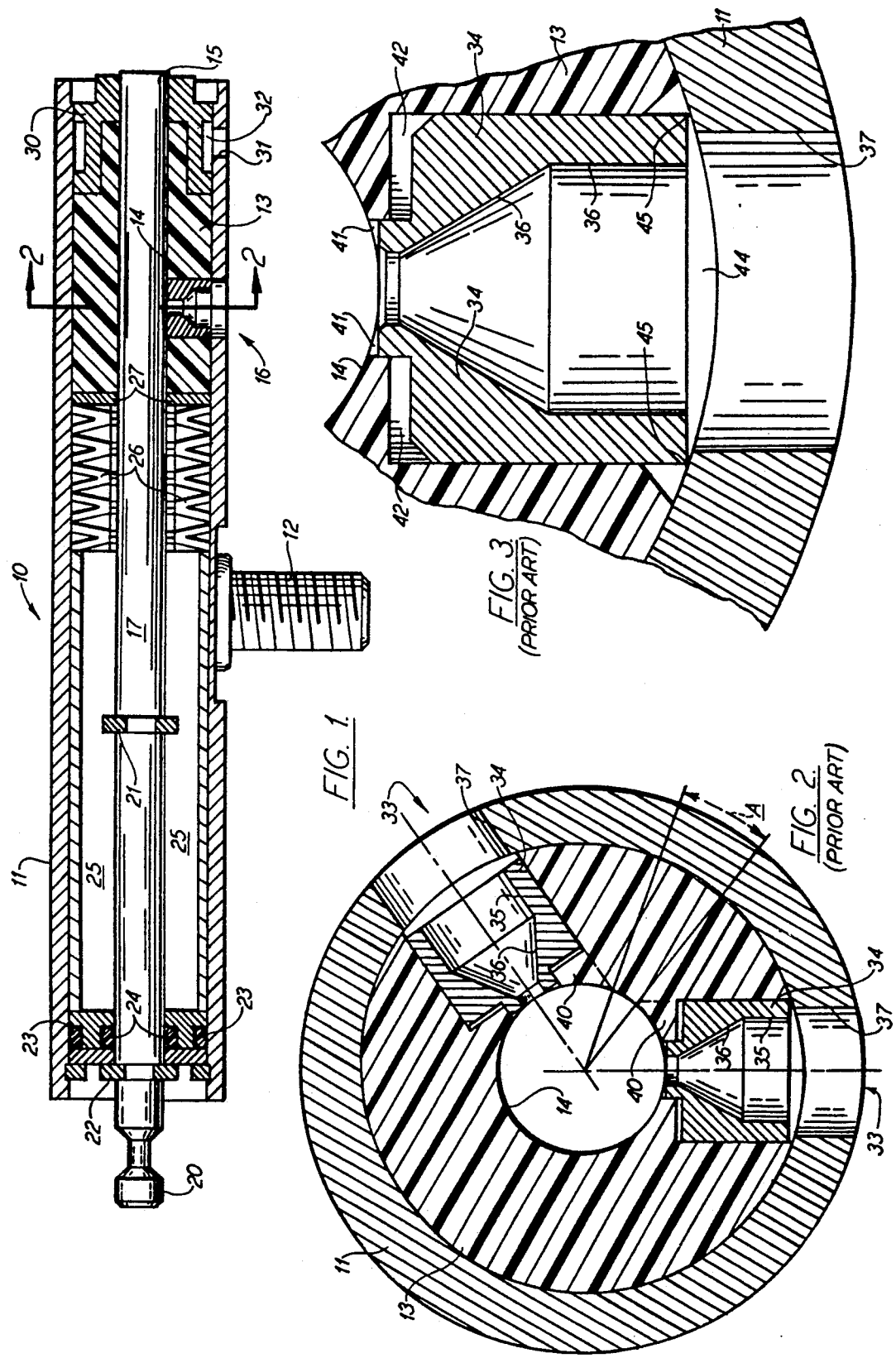

CARTRIDGE PORT DESIGN FOR DISPENSING FOAM PRECURSORS

FIELD OF THE INVENTION

The present invention relates to injection systems for foamable compositions, including an apparatus for mixing and dispensing synthetic foams, and in particular relates to an improved design for the entry ports through which foam precursors enter an injection cartridge.

BACKGROUND OF THE INVENTION

One technique for packaging articles, particularly fragile articles, comprises packaging them in some sort of polymeric foam composition. In one particular technique, the foam is generated in place during the process of packaging the articles. For example, when certain chemicals are mixed together they form polymeric products while at the same time generating gases such as carbon dioxide and water vapor. If those chemicals are selected so that they harden following the generation of the carbon dioxide and water vapor, they can be used to form hardened polymer foams in which the mechanical foaming action is caused by the gaseous carbon dioxide and water vapor leaving the mixture.

In particular techniques, synthetic foams are formed from liquid organic resins and polyisocyanates in a mixing chamber. The mixture is preferably dispensed into a receptacle, such as a package or a foam in place bag (see e.g. U.S. Pat. Nos. 4,674,268, 4,800,708 and 4,854,109), where it reacts to form a polyurethane foam.

A particular problem associated with polyurethane foams is that once mixed, the organic resin and polyisocyanate generally react relatively rapidly so that their foam product tends to accumulate in all openings through which they pass, including the openings through which they pass before mixing.

Furthermore, some of the more useful polymers that form foamable compositions are somewhat adhesive. As a result, the foamable composition, which is often dispensed as a somewhat viscous liquid, tends to adhere to objects that it strikes and then harden in place. As stated above, this causes a particular problem in the injection nozzles or cartridges in which the foam is mixed and from which they are injected into a receptacle.

Injection systems for such foamable compositions and their operation are thoroughly described in U.S. Pat. Nos. 4,568,003 and 4,898,327, both of which are commonly assigned to the assignee of the present invention and incorporated entirely herein by reference. As set forth in both of these patents, in a typical dispensing cartridge, the mixing chamber for the foam precursors is a cylindrical core having a bore that extends longitudinally therethrough. The core is typically formed from a fluorinated hydrocarbon polymer such as polytetrafluoroethylene ("PTFE" or "TFE"), fluorinated ethylene propylene ("FEP") or perfluoroalkoxy ("PFA"). Polymers of this type are widely available from several companies, and one of the most familiar designations for such materials is "Teflon", the trademark used by DuPont for such materials. For the sake of convenience and familiarity, such materials will be referred to herein as "Teflon", although it will be understood that the materials available from companies other than DuPont can also be used if otherwise appropriate.

A plurality of openings (usually two) are arranged in the core in communication with the bore for supplying the organic resin and polyisocyanate to the bore, which acts as a mixing chamber. A valving rod is positioned to slide in a close tolerance, "interference", fit within the bore to control the flow of organic resin and polyisocyanate from the openings into the bore and the subsequent discharge of the foam from the cartridge.

As set forth in the background portion of the '003 patent, during use the interference fit between the valving rod and the bore of the mixing chamber tends to distort the Teflon material and the openings therein. This process is referred to as "cold flow" or "creep", and is generally characteristic of Teflon and of all of the related polymers. The cold flow distortion of the Teflon causes several problems, including the loss of the fit between the bore and the valving rod as well as the fit between the openings through which the separate precursors enter the bore for mixing and then dispensing. Stated somewhat differently, the Teflon core is fitted in the cartridge under a certain degree of stress in order to help prevent leaks in a manner in which a gasket is fitted under stress for the same purpose. This stress, however, also encourages the Teflon to creep into any gaps or other openings that may be adjacent to it.

The '003 and '327 patents take two different approaches to solving the foam buildup problem. The '003 patent discloses a injection system in which the valving rod and mixing chamber of a portion of the injection apparatus is detachable from the remainder of the injection system so that it can be easily replaced once the foam buildup occurs or the cold flow otherwise distorts the cartridge. By making the entire cartridge easily replaceable, the '003 patent offers a useful improvement to devices and methods that preceded it. Also, the '003 patent suggests that fitting the Teflon core tightly into the shell of the cartridge will likewise help prevent cold flow.

The '327 patent takes a somewhat different approach and discloses an injection cartridge which includes a sintered porous metal insert near its exit tip. When a solvent and compressed air are forced together through the sintered portion, they generate an effervescent cleaning action at the tip of the cartridge that helps keep foam from building up. This also represented an improvement over the '003 patent which used the simple wetting of a solvent from a reservoir through the cartridge between injection cycles in an attempt to clean it.

Neither of these solutions, however, offer any improvement or solution to the cold flow problems mentioned earlier, and particularly fail to deal with the problems associated with the entry of the separate precursors into the mixing chamber and the associated fittings and hardware.

In this regard, in typical injection cartridges the separate foam precursors enter the bore through separate entry ports. Polyurethane foam tends to build up at the area at which the precursor exits the port and enters the mixing chamber. Such buildups cause spraying in the output stream, and dispensing of the mixture in an improper ratio.

In turn, foam buildups at these locations appear to be the result of two more fundamental factors. The first is crossover; i.e. unintended mixing that is caused by chemical leakage around the valving rod. It appears that this leakage is in turn caused by a poor seal between the valving rod and the mixing chamber along the path between the two ports.

A second reason is that excessive gaps exists around the port exit area. These allow polyurethane to accumulate near the exit area and gradually occlude the port.

In particular, conventional port fittings have square (i.e., flat) faces while the valving rod and bore are cylindrical. As a result, a gap always exists between the face of the port and the valving rod. This gap allows urethane to accumulate in a large percentage of such ports. Very often the polyurethane in this gap will grow into the port exit itself, causing the spraying or improper ratio problems referred to earlier.

Such gaps also give the Teflon mixing chamber a place to creep and thereby lose some of its sealing pressure, thereby aggravating the crossover problem.

Additionally, the gap at the entry side of the port can be aggravated because the a flat face typically contacts a curved surface of the cartridge housing. As a result, the port and the cartridge housing make point contact along two edge corners. In turn, high compressive loads and subsequent deformations at the contact points permit the port to move away from the valving rod at its other end. This action increases the critical gap and allows even more polyurethane to accumulate at the port exit area.

The geometry of the flat port against the round cartridge housing also creates small gaps into which the Teflon of the core can creep. This likewise probably contributes to seal failure and eventual crossover.

OBJECT AND SUMMARY OF THE INVENTION

Therefore it is an object of the present invention to provide an improved port assembly that avoids the leakage, gap, and creep problems found in existing injection cartridges.

The present invention meets this object by providing a chemical injection assembly in which a hollow cylindrical housing with an outer surface defines an outer diameter and an inner surface defines an inner diameter. The hollow portion or bore defined by the inner surface in turn defines a cylindrical mixing chamber along the axis of the housing. At least one entry port assembly is positioned within the cylindrical housing perpendicularly to the housing's axis. The port assembly comprises an entry opening that extends through the housing to form a path of fluid communication through the housing to the mixing chamber, and an entry fitting positioned in the entry opening. The fitting has front and rear coaxial portions with a common axial opening therethrough. The rear portion is adjacent to the housing and the front portion is adjacent to the cylindrical mixing chamber. The end of the front portion that is adjacent the chamber has a curved face that substantially matches and aligns with the corresponding arc of the mixing chamber so that the curved face and the inner surface are flush with one another. The entry fitting further comprises means associated with the rear portion for maintaining the curved face of the front portion substantially in place and flush with the corresponding arc portion of the chamber.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DESCRIPTION OF THE DRAWINGS

FIG. 1 is an overall cross sectional view of a typical injection cartridge to which the present invention is particularly applicable;

FIG. 2 is a cross sectional view taken along lines 2—2 of FIG. 1 and illustrating a typical arrangement of two entry ports in a prior art injection cartridge;

FIG. 3 is an enlarged view of one of the entry ports illustrated in FIG. 2, and particularly illustrating the gap and tolerance problems raised by prior art ports;

DETAILED DESCRIPTION OF THE PREFERRED EMBODIMENTS

Figure 4:
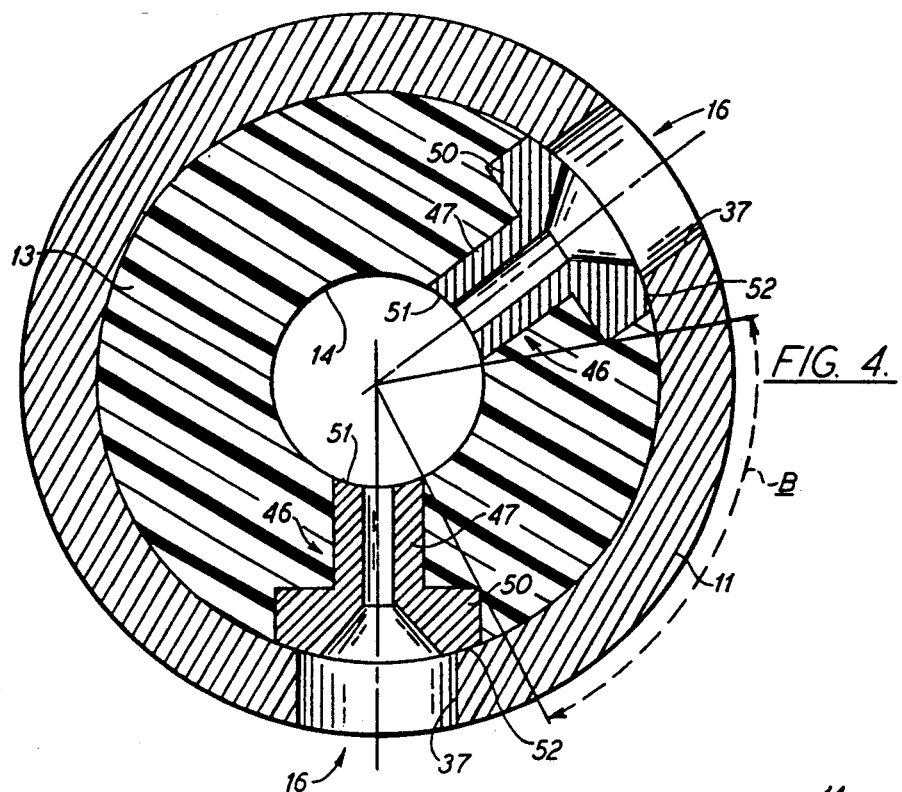
FIG. 4 illustrates a pair of port assemblies according to the present invention in place in a typical cartridge.

The advantages of the present invention can be best understood by first reviewing the overall nature of the injection cartridge, and then exploring in some detail the disadvantages of the prior constructions.

FIG. 1 is a cross sectional view of an injection cartridge of the type discussed in U.S. Pat. Nos. 4,898,327 and 4,568,003 referred to earlier herein. The injection cartridge is broadly designated at 10 and is formed of a cylindrical housing 11 with the operating pieces inside. The entire cartridge 10 can be mounted on an appropriate dispensing device using the stud or threaded rod 12 in a manner described in the '003 patent. Although the housing 11 in the illustrated embodiments is cylindrical, it will be understood that this represents a preferred, rather than limiting embodiment, and that the housing could be similarly formed into another shape, profile, or cross-section.

The cartridge illustrated in FIG. 1 further comprises a cylindrical mixing core 13 that is positioned coaxially within the cylindrical housing 11 with the outer diameter of the core substantially matching the inner diameter of the housing 11. The mixing insert 13 includes a bore 14 that defines a coaxial cylindrical mixing chamber for received foam precursors therein. Thus, both the mixing chamber and the axial bore are common names for the same single portion of the apparatus and both will be referred to by the reference numeral 14 herein. One end of the mixing chamber 14 defines a coaxial circular opening 15 through which foam precursors exits the chamber and the assembly.

An entry port assembly broadly designated at 16 is positioned within the housing 11 and extends through the housing 11 and through the core 13 to form a path of fluid communication through the housing 11 to the mixing chamber 14. A cylindrical valving rod 17 is positioned coaxially within the mixing chamber 14 and has a diameter substantially the same as the mixing chamber 14 to provide an interference fit therewith. The cylindrical valving rod 17 is longitudinally movable within the mixing chamber 14 along the common axis for valving the entry of foam precursors into the mixing chamber from the entry port assembly 16 and the exit of foam precursors from the entire cartridge through the circular opening 15. The opposite end of the valving rod has an appropriate fitting 20 for being attached to a piston, solenoid device, or any other appropriate apparatus for moving the fitting 20 back and forth to thereby control the operation of the valving rod. Respective stop rings 21 and 22 control the amount of travel of the valving rod 17, although this can also be controlled by whatever mechanism is attached to fitting 20. The valving rod 17 is sealed in place at one end of the injection cartridge 10 by a pair of O-rings 23 and 24 respectively.

The rearward portions of the injection cartridge can form a reservoir 25 shown in the left hand portions of FIG. 1. In some embodiments, the reservoir is used to store a solvent which is intended to help keep the valving rod 17 and mixing chamber 14 as clean as possible.

Other features illustrated in FIG. 1 include a set of springs or compression washers 26 which in conjunction with the retaining plate 27 urge the mixing core 13 forwardly towards the front of the cartridge 10, and secure it in place. The embodiment illustrated in FIG. 1 also includes one of the specific features of the '327 patent, namely the porous sintered tip 30 through which a mixture of air and solvent can be forced to help keep the opening 15 clean. Air and solvent are fed to the porous tip 30 through the opening 31 and the annular passageway 32.

It will be understood that the embodiment described in FIG. 1 is exemplary of the type of injection cartridge for which the present invention is quite useful, but that the invention is not limited to a specific embodiment or type of cartridge.

FIGS. 2 and 3 illustrate in greater detail the disadvantages of the prior art. FIG. 2 illustrates an injection cartridge in which two entry port assemblies are positioned in nonopposed relationship to one another and substantially perpendicularly to the axis of the housing. These entry port assemblies are substantially identical and both are broadly designated at 33. As illustrated therein, each entry port 33 comprises a body 34 usually formed of hardened stainless steel, although other materials are appropriate, provided that they do not react with the chemicals injected into, mixed in, or dispensed from the cartridge. It will be understood, of course, that all of the materials in the injection cartridge are preferably formed of such materials that are substantially inert to attack from the chemicals used therein.

The port bodies 34 have fluid communication openings therein that include both cylindrical portions 35 and a frustoconical portion 36 in which the diameter is reduced to a size appropriate for proper mixing of the chemicals. As in FIG. 1, the core 13, preferably formed of Teflon, is illustrated, as is the housing 11, and two openings 37 therein through which the foam precursors can enter the entry port fittings 33 and travel to the mixing chamber 14.

One of the main disadvantages of these prior devices illustrated in FIG. 2 is the relatively small arc labeled A. This arc A represents the approximate portion of the Teflon core that can be considered to be "sealed" directly against the mixing chamber 14, or the valving rod 17. This narrow angle results from the construction of the prior art entry port fittings 33. In particular, the shaded areas 40 represent portions of the Teflon core that are most likely to be deformed, or "creep" when pressure is applied against them either from the interference fit of the valving rod 17, or because of pressure applied by the entry port fittings 33. Specifically, the generally unusual, somewhat trapezoidal, polygonal shape of these areas makes them particularly difficult to manufacture to the most preferred tolerances (Teflon and related materials are usually milled into such parts). As a result, small gaps and poor tolerances exist making this portion of the core particularly susceptible to creep.

FIG. 3 is an enlarged view of the prior art entry port fittings illustrated in FIG. 2. As illustrated therein, because the entry port fitting body 34 is square on all sides, while the mixing chamber 14, the core 13, the valving rod 17 (not shown) and the housing 11, are all cylindrical, there always exists a geometric lack of a precise match between these respective parts. These mismatches are illustrated and labeled in the drawings as follows: a gap between the front face of the port body 34 and the mixing chamber 14 is illustrated at 41. A gap between the shoulders of the body 34 and the opening in the core is illustrated at 42. Finally, a gap between the rear face of the port body and the housing 11 is illustrated at 44. All of these gaps represent spaces into which the Teflon core can creep under pressures, particularly the mechanical pressures applied to all of these respective parts in an attempt to provide an appropriate fluid seal for the entire cartridge assembly.

Furthermore, FIG. 3 further illustrates that the port body 34 and the housing 11 meet at only two corners of the port body designated at 45. This leads to a number of similar problems discussed earlier.

Figure 5:
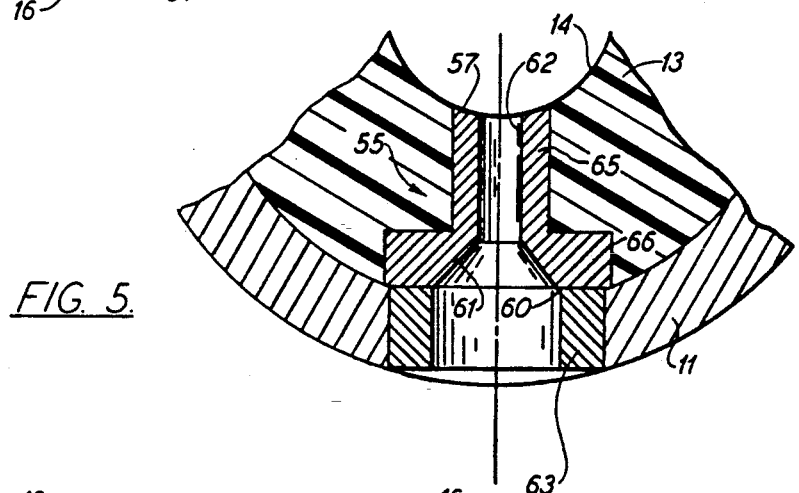
FIG. 5 shows a second embodiment of a port assembly according to the present invention.
Figure 6:
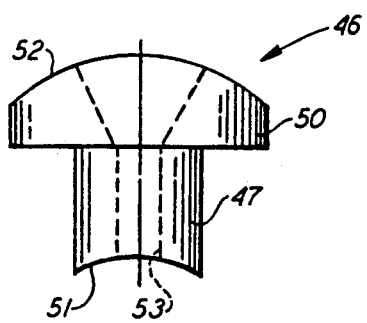
FIG. 6 is a cross-sectional view of the port fittings illustrated in FIG. 4.

The present invention is best illustrated in FIGS. 4, 5, and 6, and in which those elements common to the previous drawings will be labeled with the common numerals. These include the cylindrical housing 11 that has an outer surface that defines an outer diameter and inner surface defining an inner diameter. It will be understood that if a Teflon core 13 such as illustrated in the drawings is not incorporated, the housing 11 can be of a size and have an inner diameter such that the interior of the housing defined by the inner surface will in turn define the cylindrical mixing chamber 14. All of the illustrated embodiments, however, include a core 13.

Figure 7:
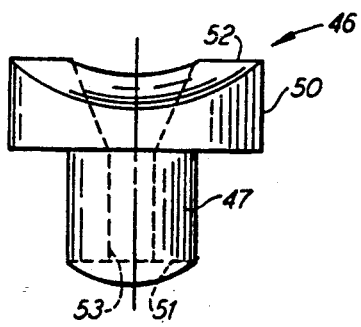
FIG. 7 is a side elevational view of the port fittings illustrated in FIGS. 4 and 6.

FIGS. 4, 6, and 7 also show the two entry port assemblies 16 that are positioned within the cylindrical housing 11 substantially perpendicular to the axis of the housing. Each port assembly 16 further comprises an entry opening 37 that extends through the housing 11, and through the core 13, to the mixing chamber 14. A pair of entry fittings broadly designated at 46 are positioned in each entry opening 37. The entry fittings 46 have front and rear coaxial portions labeled as 47 and 50 respectively in FIG. 4. The rear portion 50 is adjacent the outer surface of the housing 11, and the front portion 47 is adjacent the cylindrical mixing chamber 14. The end of the front portion 47 of the fitting 46 that is adjacent to the chamber 14 has a curved face 51 that substantially matches and aligns with the corresponding arc of the mixing chamber 14 so that the curved face and the inner surface are flush with one another. The entry fitting further comprises means associated with the rear portion 50 for maintaining the curved face 51 of the front portion 47 substantially in place and flush with the corresponding arc portion of the chamber 14. In the embodiment illustrated in FIGS. 4, 6 and 7, the maintaining means comprises a curved face 52 on the rear portion 50 of the fitting 46 for being seated flush against the inner surface of the housing 11.

As further illustrated in FIG. 4, the rear portion 50 of the entry fitting 46 has a diameter larger than the front portion 47. As a result, pressure exerted against the larger rear portion 50 will be translated into a greater securing pressure per unit area on the curved face 51 of the front portion 47. Likewise, a greater portion of the core material will be present between the respective fittings 46 along the portions of the mixing chamber 14 where the fittings meet the chamber. The greater amount of core material present between the fittings 46 reduces the possibility of deformation of the core material between the fittings 46 and produces a better seal.

More specifically, FIG. 4 also illustrates an arc B between the portions of the respective fittings 46. FIGS. 2 and 4 illustrate that arc B includes a much greater angle than arc A. Because of the curved surface 51 and the smaller diameter of the front portions 47, the larger arc B results in a more stable structure. Specifically, when the core 13 is formed of Teflon, the "sealing angle" offered by the larger amount of Teflon included within the broader angle B is much greater than the narrower angle A illustrated in FIG. 2. Additionally, the drawings illustrate that the invention provides a somewhat simplified shape for the core 13 that helps minimize the machining tolerance problems referred to earlier and in turn provides a Teflon structure that is less susceptible to creep. Furthermore, maintaining a uniform stress in the Teflon between the port and the mixing chamber is easier because the Teflon is much thicker in this portion of the core 13 than in the prior art devices.

FIG. 4 also illustrates that with curved surfaces being provided on both the front and rear portions of the fitting 46, the various gaps illustrated in FIG. 3 have been entirely eliminated, so that the possible locations into which the Teflon of the core 13 can creep are much more limited, and in some cases entirely eliminated.

As illustrated in FIGS. 4, 6 and 7, the entry port fitting 46 can be summarized as having a generally cylindrical body with a fluid communication passageway illustrated at 53 extending coaxially therethrough. The rear face 52 of the cylindrical body defines a fluid inlet opening and the front face 51 defines a fluid outlet opening for the fitting 46. The front face 51 further forms a cylindrical arc that is concave with respect to the fitting 46 with the center of the concave arc being perpendicular to the axis of the generally cylindrical fitting 46. The rear face also forms a cylindrical arc, but one that is convex with respect to the body of the fitting 46 with the center of the convex arc likewise being perpendicular to the axis of the generally cylindrical fitting 46. Said front and rear arcs share a common axis, and in preferred embodiments form parallel curves. It will be understood that although these faces are curved, they are not spheroid. A spheroid surface would similarly fail to match either the bore 14 or the housing 11, both of which are cylindrical.

A second embodiment of the invention is illustrated in FIG. 5. As in the previous illustrations, the housing is designated at 11, the Teflon core at 13, and the mixing chamber at 14. The entry port fitting is generally designated at 55, and as illustrated therein is similar to the embodiment described earlier, including a front face 57 and a rear face 60. The rear face 60 defines a fluid inlet opening 61 and the front face 57 defines a fluid outlet opening 62.

The front face 57 forms a cylindrical arc that is concave and perpendicular with respect to the axis of the generally cylindrical fitting 55. This offers the advantages of being maintained flush with the mixing chamber 14 that have already been described with respect to the previous embodiment.

In the embodiment illustrated in FIG. 5, however, the maintaining means for keeping the fitting 55 in place comprises a press fit ring 63 for urging the fitting 55 forwardly in a direction from the rear face 60 towards the front face 57 when a securing force is applied to the press fit ring 63. Any associated securing hardware which is otherwise compatible with the structure and function of the cartridge, can be used to urge the press fit ring 63 against the fitting 55. As in the embodiment illustrated in FIG. 4, the fitting 55 can be described as having respective front and rear portions 65 and 66. Front portion 65 is smaller than rear portion 66 for the reasons described earlier. It will be noted with respect to both embodiments that the size of the opening 62 in fitting 55, or the size of the opening 53 in fitting 46 can be made to be the same size as the exit openings in the prior art. The frustoconical portions, however, are positioned move rearwardly with respect to the fitting 55 (or correspondingly 46) to permit the respective front portions 65 and 47 to be made smaller in diameter, with the advantages associated therewith that have been described previously.

The advantages of the embodiment of the fitting designated 55 in comparison to those of the embodiment designated at 46 are likewise illustrated by a comparison between FIG. 4 and FIG. 5. In the embodiment 46 illustrated in FIG. 4, there exists the many advantages already described that result from the curved surfaces 51 and 52 being seated respectively against the mixing chamber 14 and the housing 11. It will be seen from FIG. 4, however, that there is no mechanism by which the fitting 46 can tightened in place with respect to the mixing chamber 14 should its tolerance fit be less than desired or needed.

In the embodiment designated at 55, however, the rear face 60 comprises a flat surface against which the press fit ring 63 can bear. Accordingly, when a mechanical securing force is applied by any convenient means against press fit ring 63, the securing force will in turn be transferred efficiently from the generally annular press fit ring 63 and its flat face against the flat face 60 of the fitting 55. In this manner, the embodiment 55 illustrated in FIG. 5 can be tightened securely into position. Additionally, because this embodiment has the capability of being tightened, the manufacturing tolerances are somewhat less demanding than are those of the first embodiment. It will be understood that although the press fit ring 63 has been illustrated, a threaded ring or any other appropriate equivalent device could conveniently used for the same purpose.

In the drawings and specification, there have been disclosed typical preferred embodiments of the invention and, although specific terms have been employed, they have been used in a generic and descriptive sense only and not for purposes of limitation, the scope of the invention being set forth in the following claims.

What is claimed is:

1. An injection assembly for an injection cartridge used to receive, mix, and disperse polymeric foam precursors, said assembly comprising:

a housing having an outer surface and an inner surface, and wherein said inner surface defines a cylindrical mixing chamber along a longitudinal axis of said housing, said cylindrical mixing chamber having a curved inner surface;

an entry port assembly positioned within said housing substantially perpendicularly to the axis of said housing, said port assembly further comprising, an entry opening in said housing that extends through said housing to form a path of fluid communication through said housing to said mixing chamber, an entry fitting positioned in said entry opening and having front and rear coaxial portions with a common axial opening therethrough, said rear portion being adjacent said outer surface of said housing and said front portion being adjacent said cylindrical mixing chamber, with the end of said front portion having a curved face that substantially matches and aligns with said curved inner surface of said cylindrical mixing chamber so that said curved face and said curved inner surface are flush with one another, and said entry fitting further comprising means associated with said rear portion for maintaining said curved face of said front portion substantially in place and flush with the corresponding arc portion of said chamber.

2. An injection assembly according to claim 1 wherein said housing comprises a cylindrical housing.

3. An injection assembly according to claim 2 and further comprising a cylindrical mixing core member positioned coaxially within said cylindrical housing and with the outer diameter of said core member substantially matching the inner diameter of said housing, said mixing core member including a bore that defines said coaxial cylindrical mixing chamber for receiving foam precursors therein, and wherein one end of said mixing chamber defines a coaxial circular opening in said assembly through which foam precursor may exit said chamber and said assembly, said core member having a respective entry opening that extends therethrough to form a path of fluid communication from said entry opening in said housing through said core member to said mixing chamber.

4. An injection assembly according to claim 1 wherein said maintaining means comprises a press fit ring adjacent said rear portion of said entry fitting for being secured to said housing in a manner that urges said ring against said rear portion to thereby maintain said fitting in place.

5. An injection assembly according to claim 1 further comprising a cylindrical valving rod positioned coaxially within said mixing chamber and having a diameter substantially the same as the diameter of said mixing chamber to provide an interference fit therewith, and being longitudinally movable within said mixing chamber along the common axis for valving the entry of foam precursors into the mixing chamber and the exit of foam precursors from said assembly.

6. An injection assembly according to claim 1 comprising two entry port assemblies positioned in nonopposed relationship to one another at an angle other than 180°.

7. An injection assembly for an injection cartridge used to receive, mix, and disperse polymeric foam precursors, said assembly comprising:

a cylindrical shell housing having an outer surface defining an outer diameter and an inner surface defining an inner diameter;

a cylindrical mixing core member positioned coaxially within said housing and with the outer diameter of said core member substantially matching the inner diameter of said housing, said mixing core member further comprising a curved inner surface that defines a coaxial cylindrical mixing chamber therein for receiving foam precursors therein, and wherein one end of said mixing chamber defines a coaxial circular opening in said assembly through which foam precursors may exit said chamber and said assembly;

a pair of entry port assemblies positioned within said cylindrical housing perpendicularly to the axis of said housing, each said port assembly further comprising, an entry opening that extends through said housing and said core to form a path of fluid communication through said housing and through said core to said mixing chamber, an entry fitting positioned in said entry opening and having front and rear coaxial portions with a common axial opening therethrough, said rear portion being adjacent said housing and said front portion being adjacent said cylindrical mixing chamber, with the end of said front portion of said fitting adjacent said chamber having a curved face that substantially matches and aligns with said curved inner surface of said mixing chamber so that said curved face and said curved inner surface are flush with one another, and said entry fitting further comprising means associated with said rear portion for maintaining said curved face of said front portion substantially in place and flush with the corresponding curved inner surface of said cylindrical mixing chamber.

8. An injection assembly according to claim 7 wherein said maintaining means comprises a curved face on said rear portion for being seated flush against the inner surface of said housing.

9. An injection assembly according to claim 7 wherein said maintaining means comprises a press fit ring adjacent said rear portion of said entry fitting for being secured to said housing in a manner that urges said ring against said rear portion to thereby maintain said fitting in place.

10. An injection assembly according to claim 7 wherein said mixing core is formed of a polymer selected from the group consisting of: polytetrafluoroethylene, fluorinated ethylene propylene, and perfluoroalkoxy.

11. An injection assembly according to claim 7 wherein said rear portion of said entry fitting has a diameter larger than the diameter of said front portion so that a greater portion of the core material will be present between the respective fittings along the portions of the mixing chamber where said fittings meet said chamber, wherein the greater amount of core material present reduces the possibility of deformation of the core material between the fittings and produces a better seal.

12. An injection assembly according to claim 7 wherein said entry port assemblies are positioned in nonopposed relationship to one another at an angle other than 180°.

13. An injection assembly according to claim 7 further comprising a cylindrical valving rod positioned coaxially within said mixing chamber and having a diameter substantially the same as the diameter of said mixing chamber to provide an interference fit therewith, and being longitudinally movable within said mixing chamber along the common axis for valving the entry of foam precursors into the mixing chamber and the exit of foam precursors from said assembly.

14. An entry port fitting for an injection assembly in an injection cartridge used to receive, mix, and disperse polymeric foam precursors, said entry port fitting comprising:

a cylindrical body with a fluid communication passageway extending coaxially therethrough;

said cylindrical body having front and rear faces in which said rear face defines a fluid inlet opening and said front face defines a fluid outlet opening; and said rear face forming a cylindrical arc that is convex with respect to said body, with the center of said convex arc being perpendicular to the axis of said cylindrical body.

15. An entry port fitting according to claim 14 wherein said front face forms a cylindrical arc that is concave with respect to said body, with the center of said concave arc being perpendicular to the axis of said cylindrical body.

16. An entry port fitting according to claim 14 wherein said rear portion has a diameter larger than the diameter of said front portion.

17. An entry port fitting according to claim 14 wherein said front and rear faces form parallel curves.

18. An entry port fitting for an injection assembly in an injection cartridge used to receive, mix, and disperse polymeric foam precursors, said entry port fitting comprising:

a cylindrical body with a fluid communication passageway extending coaxially therethrough;

said cylindrical body having front and rear faces in which said rear face defines a fluid inlet opening and said front face defines a fluid outlet opening;

said front face forming a cylindrical arc that is concave with respect to said body, with the center of said concave arc being perpendicular to the axis of said cylindrical body; and a press fit ring associated with said rear face for urging said body forwardly in a direction from said rear face towards said front face when a securing force is applied to said press fit ring.

19. An entry port fitting according to claim 18 wherein said rear portion has a diameter larger than the diameter of said front portion.

20. An entry port fitting according to claim 18 wherein said rear face comprises a flat surface.

21. An entry port fitting according to claim 20 wherein said press fit ring comprises at least one flat surface adjacent said flat surface of said rear face.

* * * * *